July 8, 1952 — J. B. HUTAFF — 2,602,555

BOTTLE HANDLING APPARATUS

Filed Dec. 22, 1949 — 3 Sheets-Sheet 1

INVENTOR.
J. B. HUTAFF
BY
W. G. Lombard
ATTORNEY

July 8, 1952  J. B. HUTAFF  2,602,555
BOTTLE HANDLING APPARATUS
Filed Dec. 22, 1949  3 Sheets-Sheet 3
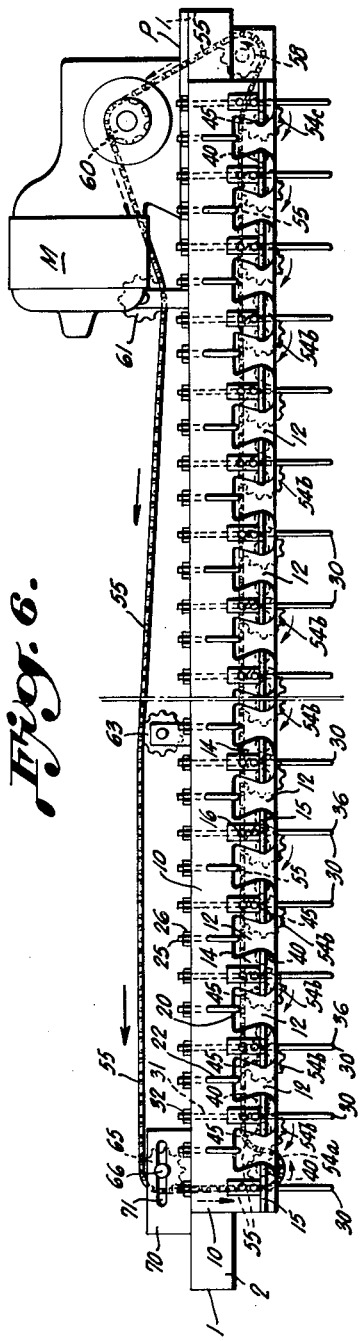
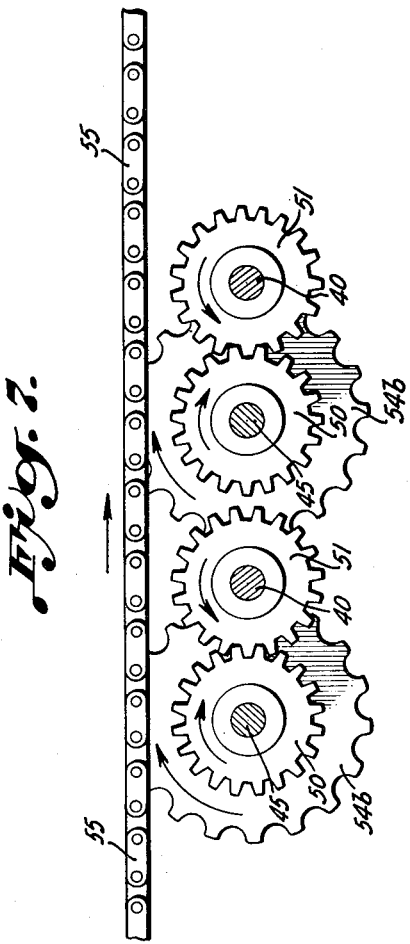
INVENTOR
J. B. HUTAFF
BY
ATTORNEY Patented July 8, 1952

2,602,555

UNITED STATES PATENT OFFICE 2,602,555

BOTTLE HANDLING APPARATUS

Julian B. Hutaff, Fayetteville, N. C., assignor to Julian's, Inc., Fayetteville, N. C., a corporation of North Carolina Application December 22, 1949, Serial No. 134,422

2 Claims. (Cl. 214—1.1)

This invention relates in general to bottle handling apparatus, and, deals more particularly, with improvements in apparatus or devices for unloading or transferring bottles and similar articles in multiple by a simple and expeditious procedure requiring only a minimum of time and effort. The present application is a continuation-in-part of prior copending application Serial Number 761,462 filed July 17, 1947, and since issued as U. S. Patent Number 2,543,578 dated February 27, 1951.

The invention has particular application and use in the handling of various well known types of refillable bottles, such as soft drink bottles, milk bottles, etc., and bottles for any other purpose which include in their design a generally cylindrical neck provided with an annular, outwardly projecting bead or rib adjacent the open or capped end thereof.

A primary object of the invention is for the provision of an improved, highly simplified bottle handling apparatus which provides for a convenient, easy and speedy operation in effecting the transfer and automatic movement of a group of such bottles in upright position from one appliance to another as, for example, in the unloading of an entire case of bottles from the bottle carrying case directly onto a conveyor or other transfer mechanism for advancing the bottles to a washing machine, filling apparatus, labelling machine, or the like.

Another object of the invention is to provide a bottle handling apparatus of the kind described by which an entire case of bottles may be unloaded from the bottle carrying case, easily and quickly, in a single operation, and with the unloaded bottles all in upright position and disposed in uniform aligned relation for proper introduction to a washing machine or other processing apparatus.

A further object of the invention is to provide a bottle unloading apparatus of this character having means for guiding and directing the movement of the bottles in upright aligned relation together with means for positively moving the bottles through the apparatus in such aligned relation.

An additional object of the invention is to provide such a bottle unloading apparatus in which the guided movement of the bottles in such upright aligned relation is effected automatically.

A more specific object of the invention is for the provision of such a bottle unloading apparatus together with automatic propelling or advancing means provided by spaced parallel revolving rods which effect an even and uniform travel of the unloaded bottles to an associated washing apparatus, or the like.

Another object of the invention is to provide a bottle handling apparatus having all the foregoing described features and advantages, and which comprises a simple, fool-proof and reliable construction that may be manufactured at relatively low cost either as a separate bottle unloading apparatus or as a highly practical and advantageous attachment to a bottle washing machine and other apparatus already in use in bottling plants, or the like.

Further objects and advantages, and other new and useful features in the construction, arrangement and general combination of parts of the invention will be readily apparent as the following description proceeds with reference to the accompanying drawings, for purposes of illustration but not of limitation, in which like reference characters designate like parts throughout, and in which:

Fig. 6 is a front elevational view of the bottle unloading apparatus as seen in Fig. 5; and, Fig. 7 is a close-up view showing the details of the mechanism for revolving a pair of slide rods providing one of the slideways in the apparatus.

Figure 4:
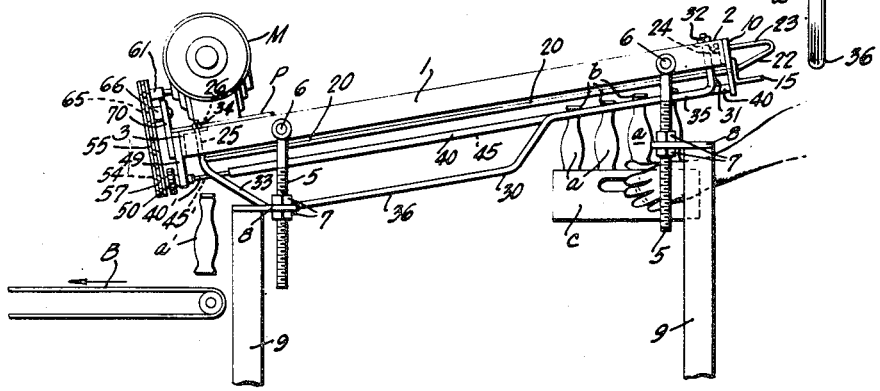
Fig. 4 is a side elevational view of the bottle unloading apparatus.

Referring now, more particularly, to the drawings, Figs. 1, 4, 5 and 6 show the general organization of the improved bottle handling apparatus as provided in a preferred construction, by way of example only, in which the apparatus is designed to accommodate as many as four cases of bottles at the same time for purposes of unloading the bottles from the cases and transferring the same in upright aligned relation to a bottle washer or other machine at the rear or discharge end of the apparatus. As seen in Fig. 4, the bottle carrying cases C loaded with empty bottles a are introduced to the unloading apparatus in continuous succession, as desired, using any of the passageways or chutes included in the overall construction of the apparatus shown in Figs. 5 and 6. Likewise, similar constructions may be provided for only one line of bottle carrying cases C, or for accommodating any number of lines of cases in side by side relation as may be necessary or desirable for any particular application or installation.

As shown in Fig. 4, the bottles $a$ are unloaded from the bottle carrying cases C at the forward end of the apparatus and move automatically to the rearward end thereof where the foremost bottles $a'$ are discharged onto a conveyor such as an endless belt B leading to a bottle washing machine (not shown) or any other bottle processing machine. While the invention is shown as provided as a unit which is adapted to be used in conjunction with a bottle washing machine, the same general apparatus may be readily provided in other similar and related constructions either as an attachment, or, as a unitary accessory mounted on a separate support in any suitable way for use with various other types of bottle processing machines and equipment in general.

In the present example, the bottle unloading apparatus is shown provided in a relatively simple inexpensive construction comprising a generally rectangular upper frame portion provided by similar side bars 1 connected to a front cross bar 2 and a rear cross bar 3. These sides and cross bars are advantageously made of ordinary angle irons or L-sections and the frame structure thus provided preferably is supported in a downwardly sloping or inclined relation from the front toward the rear of the apparatus, substantially as shown in Fig. 4. Any suitable supporting means may be employed for this purpose such as, for example, an open lower frame portion provided by a pair of vertically adjustable posts 5 at each side of the apparatus which have pivoted connections 6 to the side bars 1 and are adjustably mounted by stop nuts 7 secured to flanges 8 on standards 9, or the like.

Figure 2:
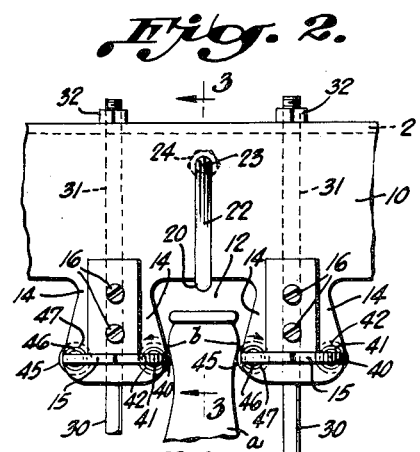
Fig. 2 is a close-up view of a front portion of the bottle unloading apparatus showing one of the entrances for a row of bottles.

The front cross bar 2 carries an elongate rack 10 attached thereto in any suitable way and the lower portion of this rack comprises spaced cut-out areas 12 defining openings of a size slightly larger than necessary to receive the necks of the bottles $a$ as seen in Fig. 2. The spaced cut-out areas 12 are separated by bell-shaped dependent tongues 14 and to each of these tongues there is attached a guide plate 15 which preferably is provided in the form of a bracket which is secured to the elongate rack 10 by screws 16, Figs. 2 and 3. The guide plates 15 are shaped substantially in the manner of pointed spades whereby each guide plate 15 has its side edges diverging outwardly from the point thereof. Accordingly, the opposing side edges of any adjacent pair of said guide plates 15 defines an inwardly tapering, funnel-shaped guide passage, the throat of which leads directly to the intermediate bottle receiving opening 12 in the rack 10.

Figure 1:
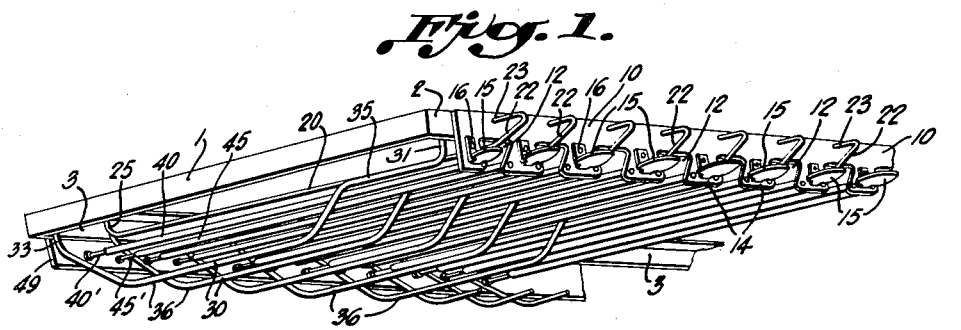
Fig. 1 is a perspective view of a front corner portion of the frame of a bottle unloading apparatus in accordance with the invention illustrating the general construction and arrangement of the bottle unloading members and associated guide members.
Figure 3:
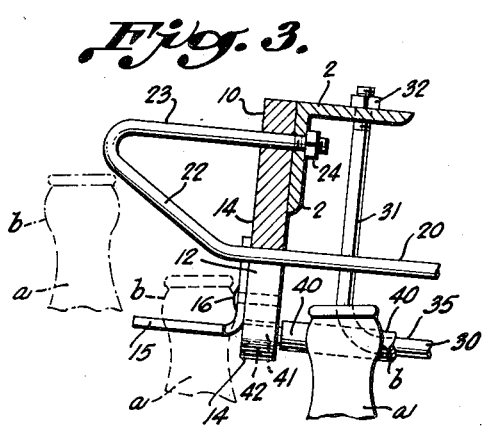
Fig. 3 is a sectional view on line 3—3 of Fig. 2, looking in the direction of the arrows.

An upper guide bar 20 is disposed in each of the bottle openings 12 and extends lengthwise from the front to the rear of the generally rectangular frame structure. As shown in Figs. 2 and 3, such a guide bar 20 preferably is bent at its forward end to define a downwardly inclined guide surface 22 leading to the associated bottle opening 12, and a return bent stud 23 which is secured in a stud opening in the front cross bar 2 and the rack 10 by a nut 24. As seen in Fig. 4, the rearward end of a guide bar 20 is provided in a simple angular bend defining a corresponding stud 25 which is similarly secured to the rear cross bar 3 by a nut 26.

At each side of a bottle receiving opening 12, a side guide rail 30 is mounted substantially centrally of the associated guide plate 15. Such a side guide rail 30 is provided in a generally U-shaped construction to comprise a forward arm 31 secured to the forward cross bar 2 by a nut 32, Figs. 2 and 4, and a rearward arm 33 secured similarly to the rearward cross bar 3 by a nut 34, Fig. 5. Preferably these guide rails 30 are provided with intermediate forward portions 35, Fig. 4, substantially in line with the guide plates 15 to facilitate the introduction of a case of bottles in an unloading operation, and lower rearward portions 36 adapted to engage the lower sides of the bottles to align and guide the bottles as they advance from the front to the rear of the apparatus, as presently to be described.

A pair of spaced revolving slide rods 40, 45, Fig. 2, are provided in alignment with each of the bottle receiving openings 12 in the rack 10. In the preferred construction shown in Figs. 2 and 3, each pair of such revolving slide rods 40, 45, are rotatably mounted at their forward ends by their respective shaft end portions 41, 46, received in openings 42, 47, respectively, in the adjacent lower corners of each pair of dependent tongues 14 at opposite sides of each bottle receiving opening 12. The rear ends of each pair of revolving slide rods 40, 45, are suitably mounted at the rear of the frame structure, as presently to be described, together with means for revolving each pair of slide rods 40, 45, in opposite directions from each other as indicated by the curved arrows in Fig. 2. Each pair of revolving slide rods 40, 45, defines a slideway in line with a bottle receiving opening 12 and the spacing of each pair of said revolving slide rods 40, 45, is only slightly wider than necessary to accommodate the necks of the bottle $a$ immediately below the outwardly projecting ribs or beads $b$ thereon adjacent the open or capped ends of said bottles $a$. Thus, as illustrated in Figs. 2 and 4, when any bottle or bottles $a$ in a group are received in the slideways defined by the pairs of inclined revolving slide rods 40, 45, the said annular beads or ribs $b$ on the bottles are adapted to ride on and slide along said rods 40, 45, both under force of gravity and also, under the mechanical propelling force of said slide rods 40, 45, revolving oppositely from each other, as aforesaid. Consequently, when the unloaded bottles are suspended on the pairs of slide rods 40, 45, at the front of the unloading apparatus, they are moved positively and automatically to the rear of the apparatus in position to pass in upright aligned relation onto a conveyor belt B or other transfer mechanism at the rear of the apparatus.

Figure 5:
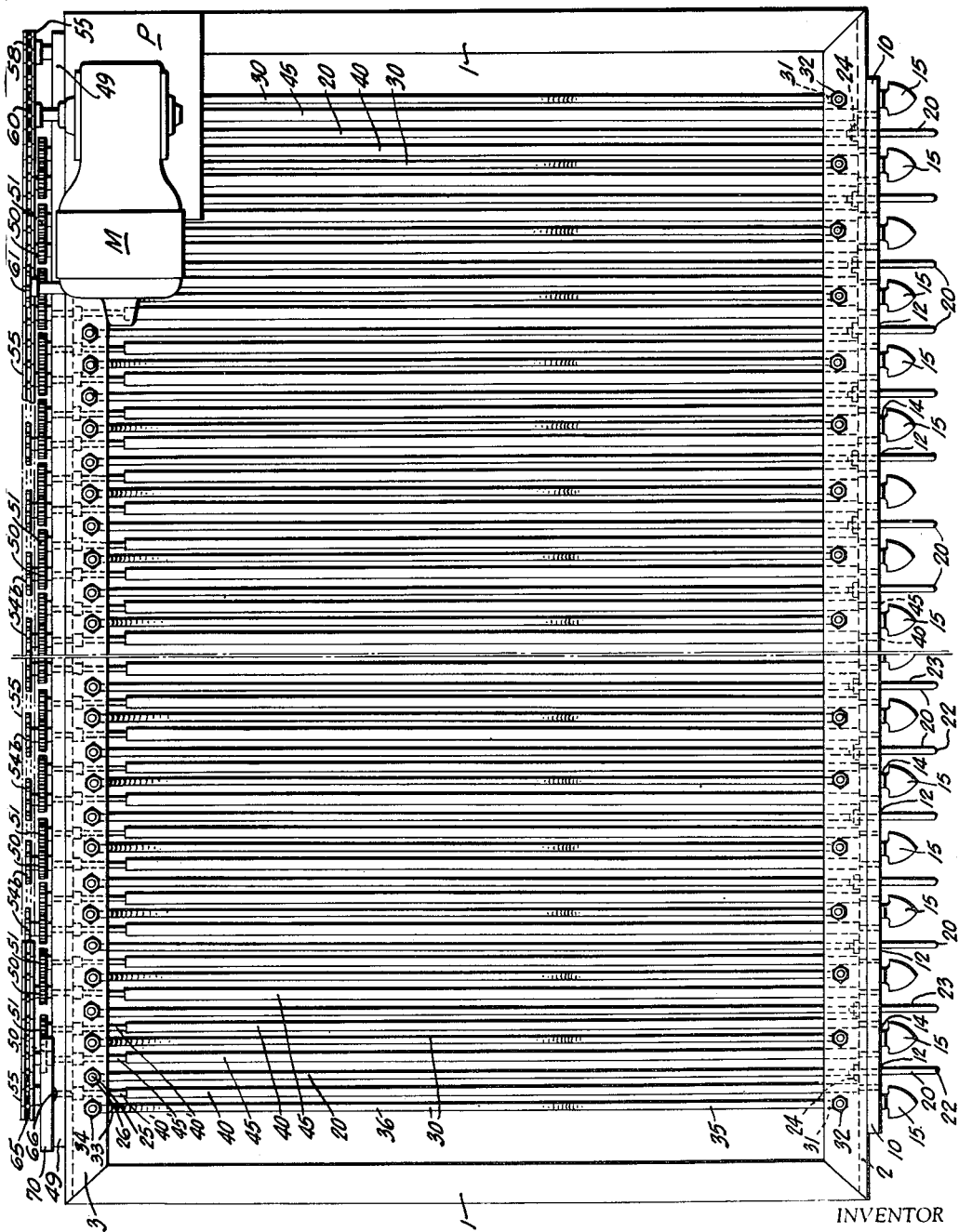
Fig. 5 is a top plan view of the bottle unloading apparatus.

As seen in Figs. 4 and 5, the downwardly inclined pairs of revolving slide rods 40, 45, include reduced shaft portions 40'' and 45', respectively, adjacent their rearward ends. These reduced shaft portions 40', 45', have a greater spacing therebetween than the width of the beads $b$ on the necks of the bottles $a$, and thus, when the bottles slide into the area of such reduced shaft portions 40', 45', the foremost bottles $a'$ fall free from said slide rods 40, 45, and drop directly onto the conveyor B or other means for advancing the same to the washing machine or other bottle processing machine at the rear of the unloading apparatus. Beyond the reduced shaft portions 40', 45', the rear ends of the revolving rods 40, 45, are journalled in a transverse supporting plate 49 secured to the rear cross bar 3 of the apparatus. The rear ends of each pair of shafts 40, 45, project outwardly beyond the supporting plate 49, as seen in Figs. 4 and 5, and these projecting shaft ends are provided with suitable pairs of meshed spur gears 50, 51 actuated by sprocket wheels 54 driven by a driving chain 55, Figs. 5 and 6, to revolve each pair of said rods 40, 45, in opposite directions from each other, as aforesaid. In general, the arrangement is such that the sprockets 54 are provided to revolve the slide rods 40 in a counterclockwise direction and the cooperating slide rods 45 in a clockwise direction.

Thus, as shown in Figs. 5, 6, and 7, the driving chain 55 engages under the initial sprocket wheel 54a, Fig. 6, at the left of the apparatus and then over the first intermediate similar drive sprocket wheel 54b, thus rotating the associated rods 40, 45 of the first slideway in opposite directions as indicated by the arrows in Fig. 6. The next and all other intermediate sprocket wheels 54b, Fig. 7, are mounted on the associated slide rods 45 together with a spur gear 50 in mesh with a companion spur gear 51 on the next adjacent slide rod 40. Accordingly, as any intermediate sprocket wheel 54b is rotated in a clockwise direction by the chain 55, the associated shaft 45 likewise rotates in a clockwise direction together with the spur gear 50 on the same shaft 45. Each spur gear 50 in turn rotates its companion spur gear 51 on the next adjacent slide rod 40 to revolve said slide rod 40 in a counterclockwise direction as shown in Fig. 7. At the right end of the apparatus, Fig. 6, a similar sprocket wheel 54c is provided on the slide rod 45 in the last slideway to rotate the same in a clockwise direction in keeping with the rotation of the other pairs of slide rods 40, 45 of the apparatus.

The chain 55 passes from said end sprocket wheel 54c under an idler sprocket 58 and over a driving sprocket 60 driven by a motor M, or other source of power, and then under an auxiliary idler sprocket 61 as it travels in the general direction of the arrows in Fig. 6. The upper length of the drive chain 55 is supported in any suitable way by one or more intermediate idler sprockets 63 together with an adjustably mounted idler sprocket 65 over which the chain travels directly to and under the first drive sprocket 54a and engages the other intermediate drive sprocket wheels 54b, as aforesaid. In the present example, the motor M is shown supported on a platform P, Fig. 5, secured onto the right rearward corner of the frame of the apparatus together with the idler sprocket 61 which serves to take up slack in said chain 55 as it passes over the driving sprocket 60 driven by said motor M. Preferably, the upper idler sprocket 65 is provided with an adjustable mounting for also taking up slack in the chain 55 when necessary, and such an adjustable mounting is shown provided by a bearing plate 70 having a slot 71 in which the shaft 66 of said idler sprocket 65 is adapted to be secured in any required position for most effective operation of said drive chain 55.

In the use of the apparatus, it will be understood from the foregoing that power from the motor M causes the driving sprocket 60 to move the chain 55 in the direction of the arrows in Fig. 6 and, in its return travel, said chain 55 drives the series of main sprocket wheels 54 which revolve the pairs of slide rods 40, 45 outwardly in opposite directions, as aforesaid.

With the machine thus operating to revolve each pair of slide rods 40, 45, outwardly in opposite directions, bottle carrying cases C, Fig. 4, containing empty bottles to be subjected to a washing or other operation, are introduced to the bottle unloading apparatus in the general manner shown in Fig. 4. A line of bottle carrying cases in succession is introduced to the apparatus by a worker who places each case of bottles in a position in which the necks of the bottles a, as aligned in rows within the case, are substantially in line with the bottle openings 12, Figs. 2 and 6, leading to the slideways between each pair of revolving slide rods 40, 45.

In this initial position, the bottles a are so positioned that the projecting beads or annular ribs b thereon are disposed slightly above the side edges of the guide plates 15, Fig. 2, and the edge surfaces of the slide rods 40, 45, which subsequently engage said beads b on the necks of the bottles. Thus, as the bottle carrying case C is moved rearwardly, the necks of the aligned bottles in each row enter the respective bottle receiving openings 12 and pass into the slideways between the pairs of revolving slide rods 40, 45. The entrance of the necks of the bottles a into these slideways is facilitated by the funnel-shaped passages defined by the adjacent converging side edges of the guide plates 15 which guide and slightly shift the bottles as necessary to dispose the necks of the bottles in suitable position for ready entrance into the respective slideways between the pairs of revolving slide rods 40, 45. The inclined surface 22 of the guide bar 20, Fig. 3, in line with each slideway, also facilitates this initial introduction of the bottles to the apparatus by properly aligning the upper ends of the bottles as they are moved into their respective slideways. After entering the slideways defined by the pairs of revolving rods 40, 45, the body portions of the bottles are maintained in their proper paths of movement by the lower rear portions 36 of the side guide rails 30, Fig. 4. The necks of the bottles a in rows, thus enter the slideways between the pairs of revolving rods 40, 45 and when all bottles in a case have entered the slideways, the carrying case C is allowed to drop free from the bottles through the open lower frame portion of the apparatus onto a case receiving platform, conveyor, or the like (not shown).

The beads or ribs b on the necks of the bottles, accordingly, are engaged by the pairs of revolving slide rods 40, 45, as shown in Figs. 2 and 4, to be suspended thereby and with said beads b adapted to ride and slide on said revolving rods 40, 45. The weight of the bottles a in such suspended position necessarily causes the same to assume a substantially vertical position. Accordingly, the bottles move automatically downwardly on said slide rods 40, 45, both under force of gravity by reason of the downwardly inclined mounting of said slide rods and also, under the positive propelling force provided by the rotation of each pair of said rods 40, 45, outwardly in opposite directions in the manner of screws engaging said beads b on the necks of the bottles. The bottles a thus travel evenly and uniformly in substantially vertical position toward the lower rearward ends of the revolving slide rods 40, 45, Fig. 4, until they reach the reduced areas 40' and 45' of said slide rods where they necessarily slip free of said slide rods, as aforesaid, and drop in such vertical position, directly onto the conveyor B or other platform. The passage of the bottles a onto the conveyor B, or the like, in vertical position is important in many instances, in that the bottles are thus disposed in upright relation ready to be received for processing by the washing machine or other apparatus without need for further handling.

It will be appreciated that in the use of the improved bottle unloading apparatus of the invention, the described procedure for unloading an entire case of bottles in a single, expeditious operation is easily performed in a matter of seconds. In a bottling plant, for example, where a great number of cases of empty bottles must be unloaded daily preparatory to the required washing operation, the use of bottle unloading apparatus in accordance with the present invention is highly desirable and advantageous and results in considerable savings in operating costs and expenses in that any such unloading is accomplished in relatively little time and by a minimum number of workers.

While the invention has been described in detail with a specific example, such example is intended as an illustration only, inasmuch as it is apparent that other modifications in the construction, arrangement and general combination of parts may be devised without departing from the spirit and scope of the invention. The present embodiment is therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed and desired to be secured by United States Letters Patent is:

1. A bottle handling apparatus for simultaneously unloading from a case a group of necked bottles arranged in rows and suspending and feeding the bottles in upright position in said apparatus, said apparatus comprising a frame, a series of pairs of spaced longitudinal slide rods mounted in said frame in downwardly inclined relation from their forward ends, each pair of said longitudinal slide rods being so spaced as to engage projections on the necks of the bottles to slidably suspend the bottles thereon, each pair of said longitudinal slide rods being adapted to receive the necks of a row of bottles at their forward ends and having reduced portions for releasing the bottles at a point removed from said forward ends, longitudinal guide bars mounted in the frame in position for guiding the upper ends of the bottles in each row of bottles suspended on said slide rods, longitudinal guide rails mounted in the frame for guiding the sides of the bottles in each row of bottles suspended on said slide rods, means for revolving each of said pairs of slide rods in opposite directions to advance the bottles suspended thereon, and said frame being open below said slide rods to permit said case to fall free of the bottles after they have been suspended on said slide rods.

2. A bottle handling apparatus for simultaneously unloading from a case a group of necked bottles arranged in rows and suspending and feeding the bottles in upright position in said apparatus, said apparatus comprising a frame, a series of pairs of spaced longitudinal slide rods mounted in said frame in downwardly inclined relation from their forward ends, each pair of said longitudinal slide rods being so spaced as to engage projections on the necks of the bottles to slidably suspend the bottles thereon, each pair of said longitudinal slide rods being adapted to receive the necks of a row of bottles at their forward ends and having reduced portions for releasing the bottles at a point removed from said forward ends, longitudinal guide bars mounted in the frame in position for guiding the upper ends of the bottles in each row of bottles suspended on said slide rods, longitudinal guide rails mounted in the frame for guiding the sides of the bottles in each row of bottles suspended on said slide rods, means for revolving each pair of slide rods in opposite directions comprising a pair of meshed spur gears on each pair of slide rods and a sprocket wheel on one of said slide rods driving one of said spur gears, a chain engaging said sprocket wheel, and means for driving said chain, said frame being open below said slide rods to permit said case to fall free of the bottles after said bottles have been suspended on said slide rods.

JULIAN B. HUTAFF.

REFERENCES CITED

The following references are of record in the file of this patent:

UNITED STATES PATENTS

| Number | Name | Date |
| --- | --- | --- |
| 2,366,256 | Harris et al. | Jan. 2, 1945 |